United States Patent [19]

Butler

[11] Patent Number: 4,826,067
[45] Date of Patent: May 2, 1989

[54] SONIC WIRE WELDERS

[75] Inventor: John D. Butler, New Berlin, Wis.

[73] Assignee: Mechtrix Corporation, Menomonee Falls, Wis.

[21] Appl. No.: 41,096

[22] Filed: Apr. 22, 1987

[51] Int. Cl.⁴ .............................................. B23K 20/10
[52] U.S. Cl. ...................................... 228/1.1; 228/4.5
[58] Field of Search .................... 228/1.1, 4.5; 269/20, 269/24, 25, 27, 32, 99

[56] References Cited

U.S. PATENT DOCUMENTS

| | | | |
|---|---|---|---|
| 2,683,386 | 7/1954 | Doebeli | 269/32 |
| 3,482,831 | 12/1969 | Blatt | 269/32 |
| 3,729,185 | 4/1973 | Roeske | 269/20 |
| 3,927,872 | 12/1975 | Sessody | 269/32 |
| 4,170,345 | 10/1979 | Townsend | 269/99 |
| 4,527,727 | 7/1985 | Renshaw | 228/1.1 |
| 4,576,213 | 3/1986 | Miller | 269/25 |
| 4,730,764 | 3/1988 | Hawkins et al. | 228/1.1 |

Primary Examiner—M. Jordan
Attorney, Agent, or Firm—Fuller, Puerner & Hohenfeldt

[57] ABSTRACT

An ultra-sonic welding machine has independently adjustable front and rear anvils. Each anvil is independently clampable at desired locations. The rear anvil is reciprocable under power to opened and closed positions relative to the front anvil to thereby permit easy insertion and withdrawal of a workpiece. The end positions of the rear anvil are positively controlled by an adjustable and clampable stop block. The invention further comprises a welding tip that has a concave working edge and relief pockets for improving the welded connection and reducing ultra-sonic energy losses.

17 Claims, 4 Drawing Sheets

SONIC WIRE WELDERS

BACKGROUND OF THE INVENTION

1. Field of the Invention

This invention pertains to fastening apparatus, and more particularly to apparatus for sonically welding metals.

2. Description of the Prior Art

Ultrasonic welding is gaining widespread acceptance as a method for joining metals. The magazine article "Joining Metals with Ultra-Sonic Welding," Machine Design, Sept. 20, 1984, gives an explanation of ultrasonic welding, as well as its advantages and disadvantages relative to other types of metal fastening methods.

The joining of insulated electrical conductors is a particularly apt application for ultrasonic welding. As a result, ultra-sonic welding machines have been designed specifically to weld insulated conductors. The machines typically include a pair of anvils that form a work station for the wires to be welded. A front anvil is usually adjustable horizontally with respect to a rear anvil, thus permitting the machine to accommodate different size conductors. A vertically reciprocable tip engages the wires placed between the anvils and applies the sonic energy. The prior tip faces that contact the wires normally have saw-tooth contours.

Despite enjoying a certain degree of commercial acceptance, the prior ultra-sonic welding machines possess certain disadvantages. Front anvil adjustability in prior machines has been accomplished by a screw that protrudes toward the machine operator. The operator must bring the wires to be joined up and around the screw to prevent catching the wire ends on the screw. That is an inefficient operation that requires extra time, motion, and care. In prior machines, the rear anvils are not adjustable. Consequently, it is not always possible to position the wires to be welded at the optimum location under the tip. In addition, with a non-adjustable rear anvil, the pressure exerted by a welded workpiece on the anvils may be so great that it is very difficult to remove the welded workpieces from the anvils. Another disadvantage of prior ultra-sonic welding machine tips is that the saw-tooth designs can cause fracture points in the outer welded nugget surface, which can degrade peel test performance. The design of certain aspects of prior ultra-sonic welding machines also renders them undesirably expensive.

Thus, a need exists for an inexpensive ultrasonic welding machine that joins insulated conductors in a more efficient manner than was heretofore possible.

SUMMARY OF THE INVENTION

The present invention provides a sonic welding device for welding together two or more workpieces by sonic energy. The invention specifically involves the use of a patterned reed tip and an anvil working surface with a serrated pattern that provides an improved weld. The invention also provides apparatus for clamping the work material, such as wires, together by means of front and rear anvils having means for manually adjusting the position of the front anvil with respect to the base. In addition, means are provided for adjusting the position of the rear anvil and of the fore and aft stroke. In that regard, an adjustable stop controls the throw of a link connected to the piston rod of a power cylinder. After adjustment, the front and rear anvils are retained in their respective desired locations by convenient clamps.

Provision is made for adjusting the clearance of the rear anvil relative to the front anvil work surface by the use of an oblong aperture in the rear anvil. A pivot pin and a screw extending into the oblong aperture afford arcuate up and down movement about the horizontal axis of the pivot pin.

The reed tip is fabricated with a concave working edge. The tip has relief pockets machined into the tip sides that lie adjacent the anvils when the tip is in contact with the workpiece. The relief pockets reduce ultra-sonic energy losses from frictional contact between the tip and anvils.

Further objects, aims and advantages of the invention will become apparent from the disclosure.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIGS. 1-7, an ultra-sonic welding machine 1 is illustrated that includes the present invention. The ultra-sonic welding machine is particularly useful for joining the inner wires of insulated electrical conductors, but it will be understood that the invention is not limited to electrical applications.

The ultra-sonic welding machine 1 includes a frame 3 to which is secured a bracket 4. The bracket 4 has a horizontal plate-like leg 5 at right angles to a vertical leg 6. The horizontal leg 5 is formed with a longitudinally extending opening 7 having a relatively wide central section 9 located between a pair of narrower end sections 2.

Placed on the top surface of the bracket horizontal plate 5 is a block-like support 8. Placed on top of the support 8 is a gib 50. The bracket 4, support 8, and the gib 50 are securely fastened to each other by screws 19 that pass through aligned clearance holes 20 in the support and bracket and that mate with appropriate tapped holes in the gib, FIG. 1. The support 8 guides a base 14 that is fixedly mounted to the bracket horizontal leg 5 by screws 17. The base 14 has a slot 15 that extends longitudinally along the base floor section 18. The base slot 15 is aligned with the longitudinal opening 7 in the bracket horizontal leg 5. The base 14 further has a longitudinal groove 10d for slidingly receiving a front anvil slide 11. A front anvil 10 fits in a groove 10a in the anvil slide 11 and is secured thereto by a screw 102. The anvil slide 11 comprises an elongated member that is adjustably positioned by means including springs 12 and a screw 13. See FIGS. 4 and 6. The springs 12 and screw 13 act in conjunction with an end plate 16 that is mounted to the end of the base 14 by conventional fasteners, not shown. The springs are received in aligned holes in the anvil slide and end plate 16, and the screw 13 extends through an appropriate clearance opening in the end plate to engage a tapped hole in the end of the anvil slide. The screw 13 includes an enlarged adjusting head 13a. The springs eliminate any play between the end plate and slide due to backlash in the screw and slide threads.

Figure 4:
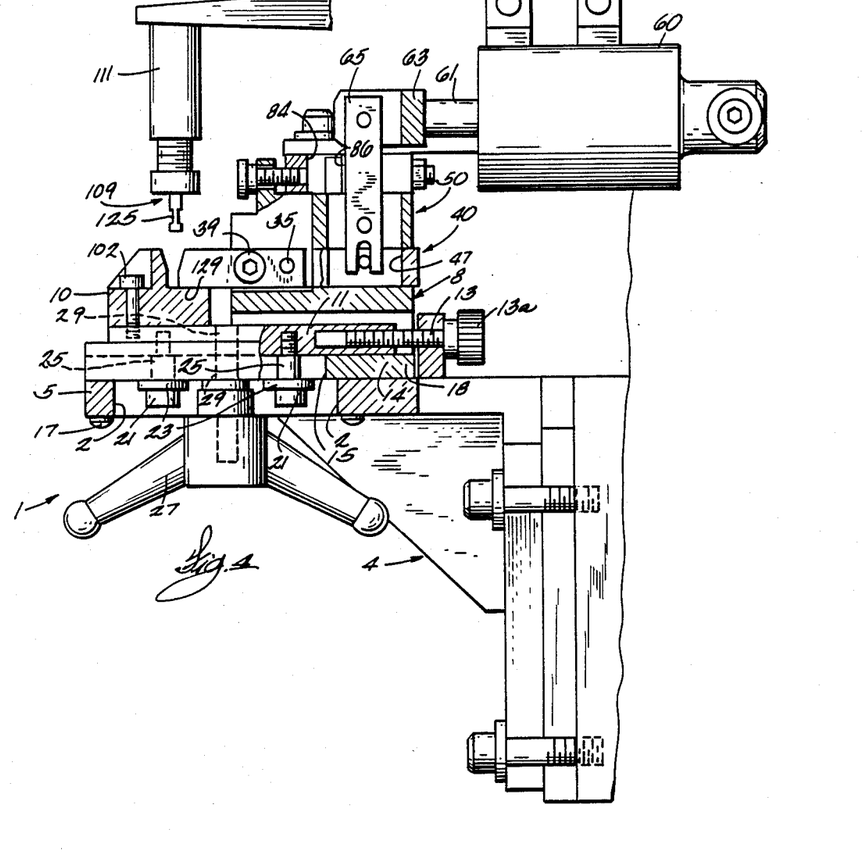
FIG. 4 is a cross-sectional view taken along lines 4—4 of FIG. 3.
Figure 5:
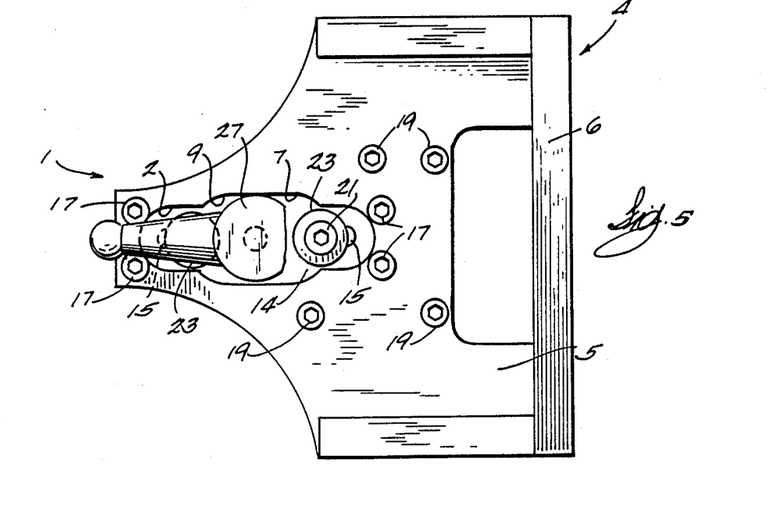
FIG. 5 is a bottom view of the apparatus shown in FIGS. 2 and 4.

To slidingly retain the anvil slide 11 within the groove 10d, a pair of shoulder screws 21 in combination with washers 23 are employed. Referring especially to FIGS. 4 and 5, the washers 23 straddle the underside of the slot 15 in the base 14. The shoulder screws 21 extend through the slot 15 and engage tapped holes in the anvil slide 11. The lengths of the shoulders 25 of the shoulder screws 21 are slightly longer than the thickness of the floor 18 of the base 14. Consequently, the anvil slide is slidably restrained within the groove 10d in the base 14.

To lock the anvil slide 11 at selected locations along the base 14, a T-handle 27 is employed in combination with a threaded stud 29. The first end of the stud 29 is secured to the T-handle for rotation therewith. The second end of the stud passes through the slot 15 in the base 14 and is threaded into a tapped hole in the anvil slide. By selectively turning the T-handle, the anvil slide is tightened against the base 14, which in turn is squeezed between the anvil slide and a washer and spacer 31 on the T-handle. The washer and spacer 31 straddle the base slot 15, and they are longitudinally slidable with the handle within the central section 9 of the bracket opening 7.

The ultra-sonic welding machine 1 of the present invention includes a rear anvil 30 that is provided with a vertical oblong aperture 32 and a parallel round aperture 34. A pin 35 inserted through aperture 34 permits pivoting the rear anvil 30 in an arc with respect to a vertical surface 41 on a rear anvil slide 40. A screw 39 is inserted through the oblong aperture 32 to engage a suitable threaded hole in the surface 41.

Figure 1:
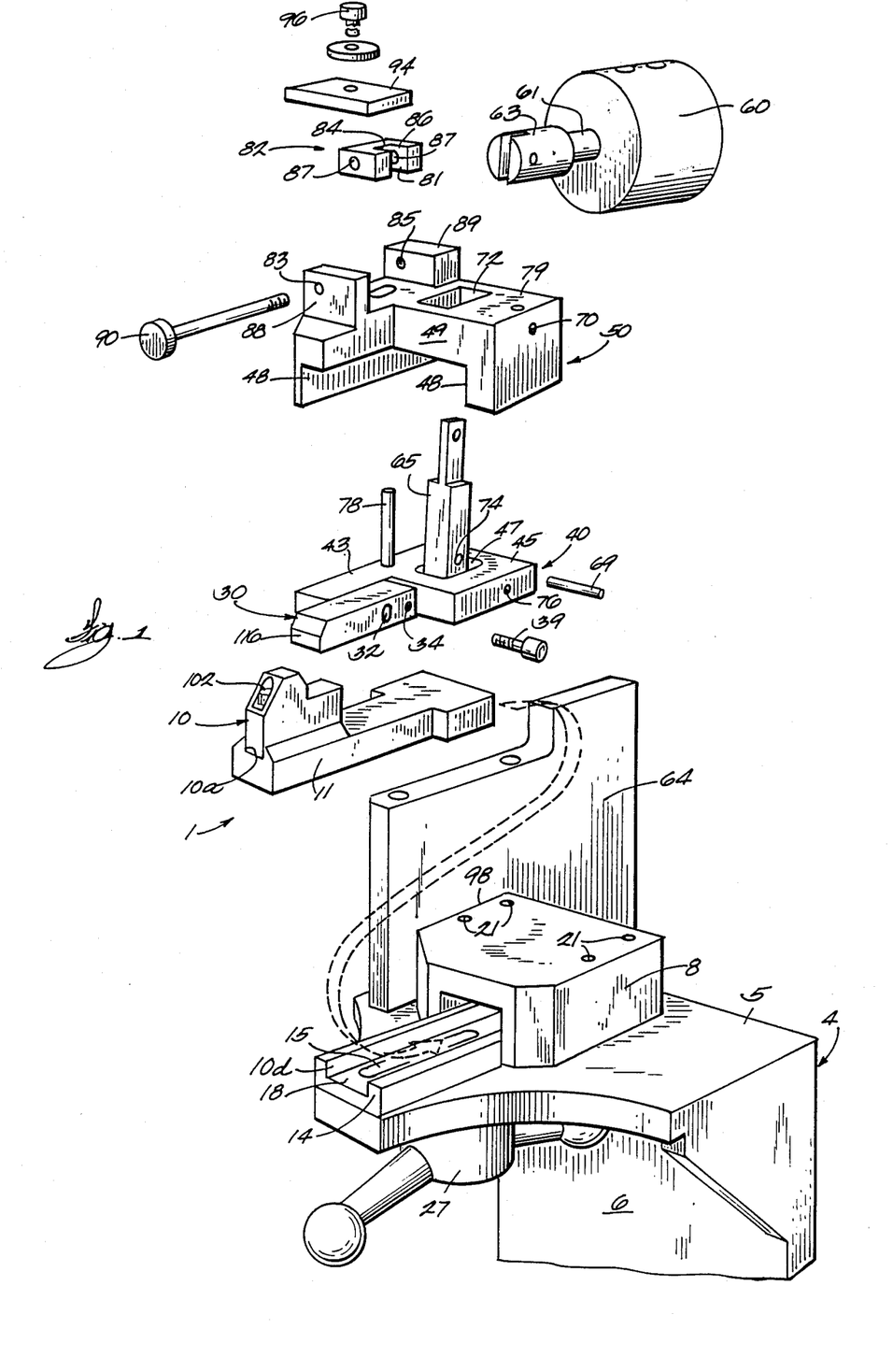
FIG. 1 is an exploded perspective view of the welding station of the ultra-sonic welding machine of the present invention.
Figure 2:
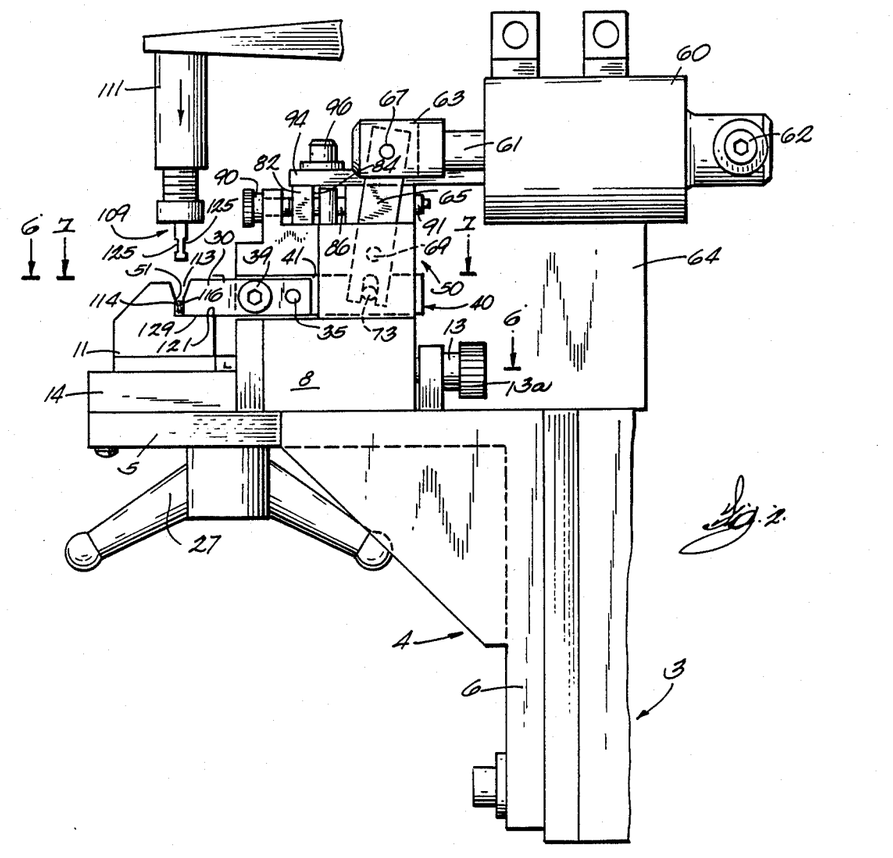
FIG. 2 is side elevational view of the apparatus of the present invention.
Figure 3:
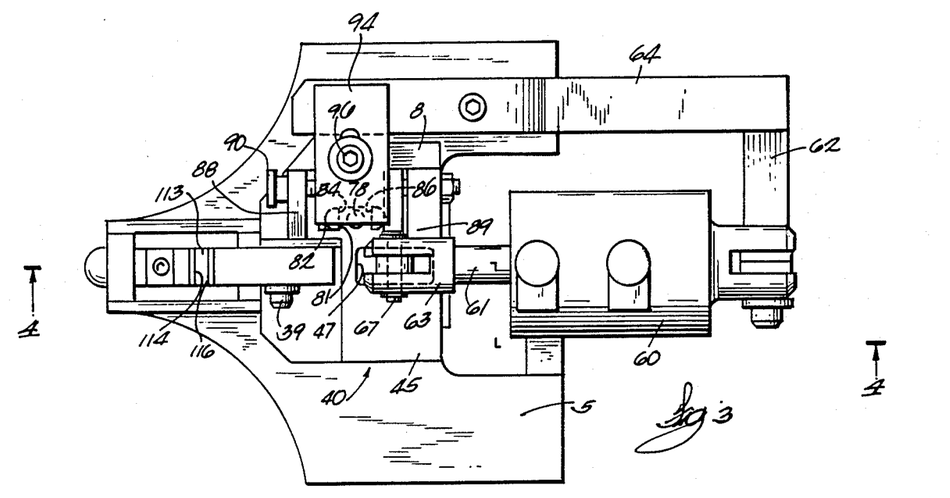
FIG. 3 is a top view of the apparatus shown in FIG. 1.
Figure 7:
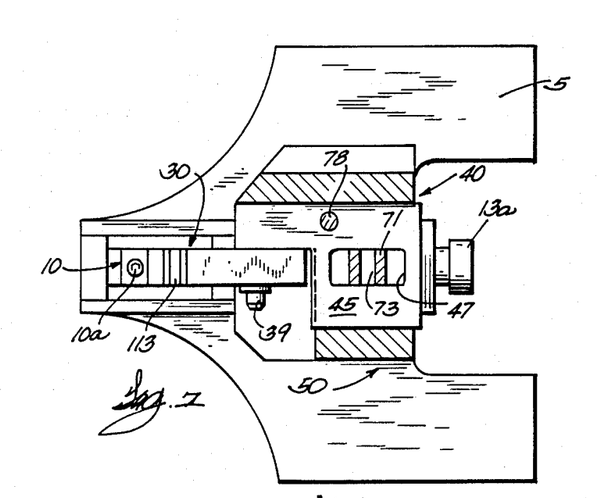
FIG. 7 is a cross-sectional view taken along lines 7—7 of FIG. 2.

As best shown in FIGS. 1, 3, and 7, the rear anvil slide 40 is generally L-shaped, with a leg portion 43 extending from a block portion 45. The vertical surface 41 forms a part of the leg portion 43. Machined in the block portion 45 is a cutout 47. The rear anvil slide 40 is guided for longitudinal reciprocation within vertical walls 48 of the gib 50. The walls 48 are connected by a roof 49. The rear anvil slide reciprocates between an open mode as shown in FIG. 4 and a closed mode, FIG. 2.

To reciprocate the rear anvil slide 40 between the open and closed modes, a power cylinder 60 is pivotally mounted to the bracket 4 by a support 62 and a cylinder bracket 64. The cylinder 60 includes a piston rod 61 and a clevice 63. It will be appreciated that the cylinder 60 may be pneumatically or hydraulically operated. Alternatively, an electrical solenoid may be used in place of the cylinder. Pivotally connected to the clevice 63 by a pin 67 is a link 65. The link 65 oscillates in a vertical plane about a horizontal axis provided by a pin 69. The pin 69 is received within a horizontal hole 70 that extends through the gib roof 49. The gib roof defines a cutout 72 that extends therethrough. The link 65 passes vertically through the cutout 72, and the pin 69 extends horizontally through the gib cutout so as to intersect the link and pass through a pivot hole 74 in the link, FIG. 1. The lower end 71 of the link is shaped as a fork to capture a pin 73 that is fit into horizontal hole 76 and that passes through the cutout 47 in the rear anvil slide 40, FIGS. 1, 2, and 4. The link fork end 71 extends into the cutout 47 in the rear anvil slide to capture the pin 73. Accordingly, horizontal movement of the cylinder piston rod 61 is converted to synchronous but opposed horizontal motion of the rear anvil slide.

In the preferred embodiment, means are provided to afford adjustable stops to control the positions of the rear anvil slide 40 in the open and closed modes. The adjustable stop means comprises an upstanding pin 78 that is pressed into the rear anvil slide. The pin 78 passes through an oblong vertical passage 80 in the gib 50 and is received in a slot 81 in a stop block 82. The stop block 82 rides on gig top surface 79 between two upstanding ears 88 and 89. The stop block slot 81 has opposed faces 84 and 86. The faces 84 and 86 lie on opposite sides of the pin 78 to control the stroke of the cylinder piston rod 61 and thus the position of the rear anvil slide in the open and closed modes. To adjust the open and closed positions by means of the stop block 82, the gib upstanding ears 88 and 89 have clearance holes 83 and 85, respectively, that receive a long screw 90. The screw 90 is retained axially in the gib ears by a nut 91. The threads of screw 90 mate with a threaded hole 87 in the stop block. Rotating the screw 90 slides the stop block between the ears 88 and 89 to set the end limits of the rear anvil slide stroke. To clamp the stop block in the adjusted location, a clamping plate 94 is releasably secured to the support 8 by means of a long screw 96 that engages tapped hole 98. Tightening the screw 96 causes the clamp plate 94 to bear on the stop block and the cylinder bracket 64.

Cooperating with the front anvil 10 and rear anvil 30 is a reed tip 109 that is connected to the lower end of a ram 111. The ram 111 reciprocates vertically by known means, not illustrated. The ram inserts the tip 109 into and withdraws it from a work station 113 defined by the front anvil jaws surface 114, rear anvil jaw surface 116, and front anvil work surface 121. The workpieces 51 are placed between the front and rear anvil jaw surfaces 114 and 116, respectively, for being held thereby when the tip is inserted into the work station 113 to contact and weld the workpieces by sonic energy in known manner. The versatility provided by the adjustability of both the front anvil 10 and the rear anvil 30 enables using offset tips or centered tips on the same ultra-sonic welding machine 1.

Figure 8:
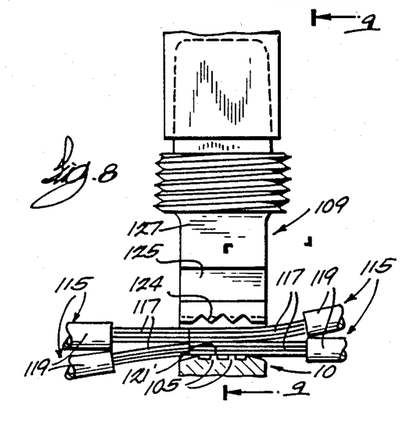
FIG. 8 is an enlarged end view of four insulated conductors in place at the work station of the ultra-sonic welding machine of the present invention for being welded together.
Figure 9:
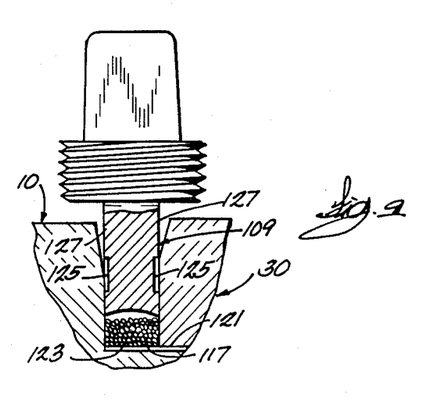
FIG. 9 is a view taken along lines 9—9 of FIG. 8.
Figure 10:
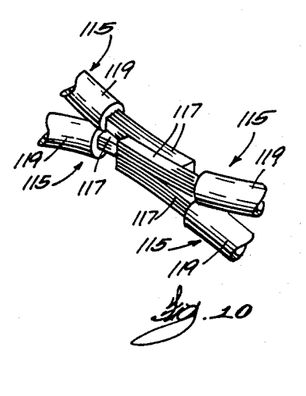
FIG. 10 is a perspective view of four insulated conductors joined together by the apparatus of the present invention.

Turning to FIGS. 8 and 9, a tip 109 is shown inserted in the work station 113 to contact and weld workpieces that consist of four insulated conductors 115 having multiple inner wires 117. The insulation 119 is stripped from the ends of the conductors 115 by known means prior to the wires 117 being placed on the front anvil work surface 121 at the work station 113. FIG. 10 depicts the wires 117 of four insulated conductors welded together. It will be understood, of course, that more or fewer than four insulated conductors may be welded together at the work station of the present invention.

Figures 6, 11:
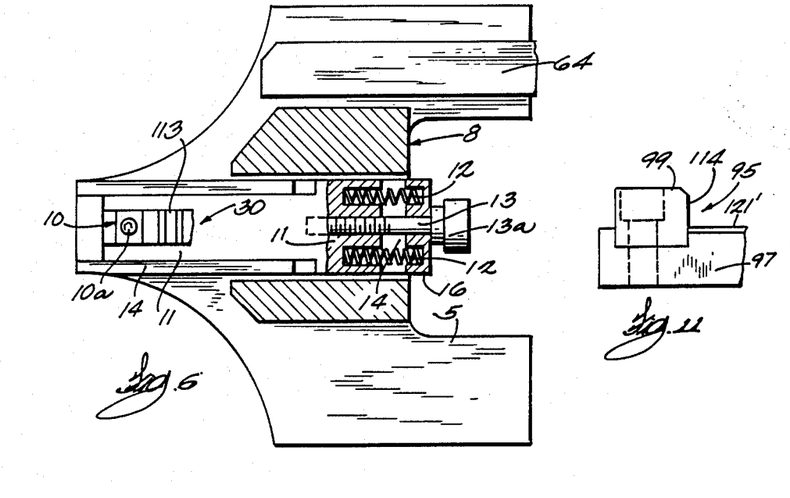
FIG. 6 is a cross-sectional view taken along lines 6—6 of FIG. 2.
FIG. 11 is a side view of a modified embodiment of a front anvil according to the present invention.
Figure 12:
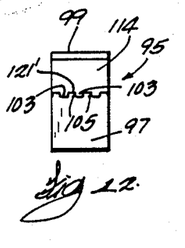
FIG. 12 is an end view of the modified front anvil shown in FIG. 11.

The versatility of the present invention is further demonstrated by the various designs that are possible for the front anvil. Referring to FIGS. 11 and 12, a two-piece front anvil assembly 95 is illustrated. The front anvil assembly 95 comprises a slotted base member 97 and an insert 99 that is screwed to the base member. The base member 97, in turn, is fastened to the anvil slide 11 by a fastener that is analogous to screw 102. The two-piece design enables the base work surface 121' to be manufactured with longitudinally extending serrations. In the illustrated construction, the serrations are composed of three grooves 103 that are separated by a pair of flat-topped lands 105. The serrated design of the work surface 121' is also shown in FIG. 8.

Further in accordance with the present invention, the working edge 123 of the tip 109 is fabricated with a U-shaped concave contour. Longitudinally extending serrations 124 are machined into the U-shaped contour 123. The U-shaped contour greatly reduces the production of fracture points in the workpiece outer welded nugget surface. Consequently, the peel test performance resulting from the use of the tip of the present invention is greatly improved compared with the performance from using prior tips.

It is a feature of the tip 109 of the present invention that ultra-sonic energy losses from frictional contact between the tip and the anvils 10 and 30 are minimized. To achieve that purpose, a relief pocket 125 is machined on both tip sides 127 that are adjacent the anvils when the tip is inserted into the work station 113.

Another important aspect of the rear anvil 30 of the present invention is the oblong aperture 32. That aperture enables the rear anvil to be adjusted such that its undersurface 129 mates perfectly with the work surface 121 of the front anvil 10. That is an important feature, as it allows the elimination of gaps or cracks between the mating anvils, which could allow stray wires 117 to slip in. Consequently, rear anvil adjustability allows mass production methods for the machine 1 and perishable tooling associated with the present invention, wherein subtle dimensional variations and tolerances are almost always unavoidable.

To use the ultra-sonic welding machine 1 of the present invention, it will be assumed that the position of the front anvil 10 will be adjusted first to suit the particular workpieces 51 and the tip 109 that will operate on the workpieces. T-handle 27 is loosened. Knob 13a of screw 13 is rotated in the appropriate direction to slide the front anvil slide 11 and the anvil 10 to the desired location. The T-handle is then tightened to retain the front anvil in place. The rear anvil 40 is then adjusted to set its position relative to the front anvil in the open and closed modes. Rear anvil adjustment is accomplished by loosening the screw 96 that bears against the stop block 82. The screw 90 is then turned to slide the stop block to set the rear anvil stroke limits. The amount of clamping force on the workpieces 51 may also be set at the anvil closed position by setting the stop block face 84 such that the rear anvil jaw surface 116 contacts the workpieces before the pin 78 strikes the face 84, as is shown in FIG. 2. In each instance, the rear anvil position in the open mode is governed by the face 86, FIG. 4. When the stop block is in the correct location, the screw 96 is tightened to maintain the rear anvil open and closed positions until further adjustment is desired. The reciprocation of the ram 111 and the operation of the cylinder 60 can be synchronized to automatically insert the tip 109 into the work station 113 when the rear anvil is in the closed mode and to withdraw the ram after the rear anvil has been positioned to the open mode. With the anvils in the open mode, no pressure remains on the welded workpiece, so it can easily be removed from the work station.

Thus, it is evident that there has been provided, in accordance with the invention, an ultrasonic welding machine that fully satisfies the objects and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. Apparatus for welding multiple workpieces together comprising:
   a. front and rear anvils for holding the workpieces at a work station;
   b. a reed tip for applying sonic energy to the workpieces; and
   c. means for adjusting the front anvil with respect to the rear anvil and for locking the front anvil in a selected location comprising:
      i. a base having a longitudinal slot therein;
      ii. a slide supporting the front anvil and adapted to reciprocate within the base;
      iii. manually operated threaded adjustment means interconnected between the base and slide for reciprocating the slide relative to the base; and
      iv. clamp means for clamping the slide to the base, the clamp means comprising a handle that straddles the base slot and that has a threaded portion that extends through the base slot to engage a tapped hole in the slide,
   so that turning the handle selectively clamps and unclamps the slide to the base.

2. Apparatus for welding multiple workpieces together comprising:
   a. front and rear anvils for holding the workpieces at a work station;
   b. a reed tip for applying sonic energy to the workpieces; and
   c. means for adjusting the front anvil with respect to the rear anvil and for locking the front anvil in a selected location comprising;
      i. a base;
      ii. a slide supporting the front anvil and adapted to reciprocate with the base;
      iii. manually operated threaded adjustment means interconnected between the base and slide for reciprocating the slide relative to the base, wherein the manually operated threaded adjustment means comprises
      a plate attached to the base;

a screw rotatably mounted to the plate and threadedly received in the slide; and at least one spring for urging the slide and plate away from each other to thereby take up backlash in the threads between the base and slide; and iv. clamp means for clamping the slide to the base.

3. Apparatus for welding multiple workpieces together comprising:
a. front and rear anvils for holding the workpieces at a work station;
b. a reed tip for applying sonic energy to the workpieces; and
c. means for adjusting the rear anvil with respect to the front anvil comprising:
   i. frame means;
   ii. a slide having a mounting surface for mounting the rear anvil to the slide, the slide being adapted to reciprocate along the frame means and to reciprocate the rear anvil therewith relative to the frame means between an open mode and a closed mode with respect to the front anvil;
   iii. a power cylinder mounted to the frame means and having a piston rod;
   iv. link means for connecting the slide to the piston rod; and
   v. pivot means for pivotally connecting the link means to the frame means,
so that actuating the piston rod produces synchronous reciprocation of the slide.

4. Apparatus for welding multiple workpieces together comprising:
a. front and rear anvils for holding the workpieces at a work station, the rear anvil defining an oblong aperture therethrough;
b. a reed tip for applying sonic energy to the workpieces;
c. means for adjusting the rear anvil with respect to the front anvil comprising:
   i. frame means;
   ii. a slide having a mounting surface for mounting the rear anvil to the slide, the slide being adapted to reciprocate the rear anvil relative to the frame means between an open mode and a closed mode with respect to the front anvil;
   iii. a power cylinder mounted to the frame means and having a piston rod;
   iv. link means for connecting the slide to the piston rod; and
   v. pivot means for pivotally connecting the link means to the frame means;
d. a pin pressed into the slide mounting surface for pivotally receiving the rear anvil; and
e. a screw passing through the rear anvil oblong aperture and engaging the slide,
so that the rear anvil may be adjusted in an arc about the pin and locked in a selected location by means of the screw.

5. Apparatus for welding multiple workpieces together comprising:
a. front and rear anvils for holding the workpieces at a work station;
b. a reed tip for applying sonic energy to the workpieces; and
c. means for adjusting the rear anvil with respect to the front anvil comprising:
   i. frame means;
   ii. a slide having a mounting surface for mounting the rear anvil to the slide, the slide being adapted to reciprocate the rear anvil relative to the frame means between an open mode and a closed mode with respect to the front anvil;
   iii. a power cylinder mounted to the frame means and having a piston rod;
   iv. link means for connecting the slide to the piston rod; and
   v. pivot means for pivotally connecting the link means to the frame means; and
d. adjustable stop means acting between the frame and the slide for controlling the reciprocation of the slide and the position of the rear anvil when it is in the closed and open modes independently of the front anvil, wherein the adjustable stop means comprises:
   i. a pin extending from the slide;
   ii. a stop block having wall means defining an opening for receiving the pin, the wall means defining opposed forward and rearward stop faces that engage the pin to limit the travel of the rear anvil slide and thereby control the slide positions at the opened and closed modes;
   iii. means for adjustably moving the stop block; and
   iv. clamp means for clamping the stop block to the frame means at a desired location.

6. A machine for holding work pieces together comprising:
a. frame means;
b. a front anvil slide adapted to reciprocate within the frame means;
c. a front anvil secured to the front anvil slide for reciprocation therewith, the front anvil having a jaw surface and a work surface;
d. adjustment means for manually adjusting the position of the front anvil with respect to the frame means;
e. a rear anvil slide adapted to reciprocate within the frame means;
f. a rear anvil mounted to the rear anvil slide and having a jaw surface that cooperates with the front anvil jaw surface and work surface to create a work station for holding a workpiece;
g. means for reciprocating the rear anvil slide with respect to the front anvil to create work station open and closed modes;
h. adjustment means for manually adjusting the positions of the rear anvil slide in the opened and closed modes;
i. first clamp means for clamping the front anvil slide to the frame means at a selected location; and
j. second clamp means for clamping the adjustment means for manually adjusting the positions of the rear anvil slide in the opened and closed modes.

7. The machine of claim 6 wherein:
a. the frame means comprises a base having a longitudinal groove for receiving the front anvil slide; and
b. the adjustment means for manually adjusting the front anvil slide comprises:
   i. a plate attached to the base;
   ii. a screw rotatably mounted to the plate and threadedly received in the slide; and
   iii. at least one spring for urging the slide and plate away from each other to thereby take up any backlash in the threads between the base and slide.

8. The machine of claim 6 wherein:

a. the frame means comprises a base having a longitudinal slot therein, the base being adapted to receive the front anvil slide for reciprocation therein; and b. the first clamp means for clamping the front anvil slide to the frame means comprises a handle that straddles the base slot and that has a threaded portion extending through the base slot to engage a tapped hole in the front anvil slide, so that turning the handle selectively clamps and unclamps the slide to the frame means.

9. A machine for holding workpieces together comprising:

a. frame means;

b. a front anvil slide adapted to reciprocate within the frame means;

c. a front anvil secured to the front anvil slide for reciprocation therewith, the front anvil having a jaw surface and a work surface, wherein the front anvil comprises:

i. a base member having a work surface and a slot, the base member being fastened to the front anvil slide; and ii. an insert placed within the base member slot and secured thereto, the insert having a surface that intersects and is substantially perpendicular to the work surface to thereby provide an anvil jaw surface;

d. adjustment means for manually adjusting the position of the front anvil with respect to the frame means;

e. a rear anvil slide adapted to reciprocate within the frame means;

f. a rear anvil mounted to the rear anvil slide and having a jaw surface that cooperates with the front anvil jaw surface and work surface to create a work station for holding a workpiece;

g. means for reciprocating the rear anvil slide with respect to the front anvil to create work station open and closed modes; and h. adjustment means for manually adjusting the positions of the rear anvil slide in the opened and closed positions.

10. The machine of claim 9 wherein the base member work surface defines a plurality of serrations extending longitudinally in the direction of front anvil adjustment.

11. A machine for holding workpieces together comprising:

a. frame means;

b. a front anvil slide adapted to reciprocate within the frame means;

c. a front anvil secured to the front anvil slide for reciprocation therewith, the front anvil having a jaw surface and a work surface;

d. adjustment means for manually adjusting the position of the front anvil with respect to the frame means;

e. a rear anvil slide adapted to reciprocate within the frame means;

f. a rear anvil mounted to the rear anvil slide and having a jaw surface that cooperates with the front anvil jaw surface and work surface to create a work station for holding a workpiece, wherein:

i. the rear anvil has an undersurface; and ii. the rear anvil is lockably adjustably mounted to the rear anvil slide to swing in an arc relative to the rear anvil slide and to provide proper contact of the rear anvil undersurface with the front anvil work surface;

g. means for reciprocating the rear anvil slide with respect to the front anvil to create work station opened and closed modes; and h. adjustment means for manually adjusting the positions of the rear anvil slide in the opened and closed modes.

12. A machine for holding workpieces together comprising:

a. frame means;

b. a front anvil slide adapted to reciprocate within the frame means;

c. a front anvil secured to the front anvil slide for reciprocation therewith, the front anvil having a jaw surface and a work surface; and d. adjustment means for manually adjusting the position of the front anvil with respect to the frame means;

e. a rear anvil slide adapted to reciprocate within the frame means;

f. a rear anvil mounted to the rear anvil slide and having a jaw surface that cooperates with the front anvil jaw surface and work surface to create a work station for holding a workpiece, wherein:

i. the rear anvil has an undersurface;

ii. the rear anvil has an oblong aperture and a round aperture therethrough;

iii. a pin is pressed into the rear anvil slide and is received within the rear anvil round aperture; and iv. a locking screw passes through the rear anvil oblong aperture and engages the rear anvil slide, g. means for reciprocating the rear anvil slide with respect to the front anvil to create work station opened and closed modes; and h. adjustment means for manually adjusting the positions of the rear anvil slide in the opened and closed modes, so that the rear anvil may be angularly adjusted about the pin to provide proper contact between the rear anvil undersurface and the front anvil work surface.

13. A machine for holding workpieces together comprising:

a. frame means;

b. a front anvil slide adapted to reciprocate within the frame means;

c. a front anvil secured to the front anvil slide for reciprocation therewith, the front anvil having a jaw surface and a work surface;

d. adjustment means for manually adjusting the position of the front anvil with respect to the frame means;

e. a rear anvil slide adapted to reciprocate within the frame means;

f. a rear anvil mounted to the rear anvil slide and having a jaw surface that cooperates with the front anvil jaw surface and work surface to create a work station for holding a workpiece;

g. means for reciprocating the rear anvil slide with respect to the front anvil to create work station opened and closed modes, wherein the means for reciprocating the rear anvil slide comprises:

i. rod means connected to the frame means for reciprocation under power;

ii. a link pivotally connected to the rod means and to the rear anvil slide; and iii. pivot means mounted to the frame means for pivotally receiving the link; and h. adjustment means for manually adjusting the positions of the rear anvil slide in the opened and closed modes, so that reciprocation of the rod means produces synchronous reciprocation of the rear anvil slide.

14. A machine for holding workpieces together comprising:
    a. frame means;
    b. a front anvil slide adapted to reciprocate within the frame means;
    c. a front anvil secured to the front anvil slide for reciprocation therewith, the front anvil having a jaw surface and a work surface;
    d. adjustment means for manually adjusting the position of the front anvil with respect to the frame means;
    e. a rear anvil slide adapted to reciprocate within the frame means;
    f. a rear anvil mounted to the rear anvil slide and having a jaw surface that cooperates with the front anvil jaw surface and work surface to create a work station for holding a workpiece;
    g. means for reciprocating the rear anvil slide with respect to the front anvil to create work station open and closed modes; and
    h. adjustment means for manually adjusting the positions of the rear anvil slide in the open and closed modes wherein the adjustment means for manually adjusting the position of the rear anvil slide in the opened and closed modes comprises:
        i. a stop block slidable on the frame means and defining two opposed faces;
        ii. a pin extending from the rear anvil slide and received between the two stop block faces; and
        iii. an adjustment screw rotatably received and axially constrained in the frame means and threadedly engaged in the stop block,
    so that turning the adjustment screw moves the stop block and opposed faces to adjust the end positions fo the pin extending from the rear anvil slide to thereby positively control the position of the rear anvil in the open and closed modes.

15. The machine of claim 14 further comprising clamp means for clamping the stop block in the desired adjustment location.

16. The machine of claim 15 wherein the clamp means for clamping the stop block comprises:
    a. a plate that bears on the stop block and on the frame means; and
    b. a screw extending from the plate to the frame means,
    so that tightening the screw clamps the stop block against the frame means to prevent stop block movement.

17. The machine of claim 14 wherein:
    a. the frame means comprises a gib having opposed side walls for guiding the reciprocation of the rear anvil slide, the gib having a cutout and a surface for slidingly supporting ths stop block, the gib having a pair of ears for rotationally receiving the adjustment screw; and
    b. the means for reciprocating the rear anvil slide comprises:
        i. rod means attached to the frame means for reciprocation under power;
        ii. a link pivotally connected to the rod means and to the rear anvil slide and passing through the gib cutout for being pivotally received by the link,
    so that reciprocation of the rod means produces synchronous reciprocation of the rear anvil slide.

* * * * *